(12) United States Patent
Lee et al.

(10) Patent No.: US 11,010,007 B2
(45) Date of Patent: May 18, 2021

(54) INPUT SENSING PANEL INCLUDING A PLURALITY OF HOLES AND A DISPLAY DEVICE HAVING THE SAME

(71) Applicant: SAMSUNG DISPLAY CO., LTD., Yongin-si (KR)

(72) Inventors: Minsu Lee, Yongin-si (KR); Jeong Won Kim, Seoul (KR); Dae-Hyun Noh, Hwaseong-si (KR); Yongsung Park, Seoul (KR); Seungbin Lee, Cheonan-si (KR); Richard James, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/733,858

(22) Filed: Jan. 3, 2020

(65) Prior Publication Data

US 2020/0264732 A1 Aug. 20, 2020

(30) Foreign Application Priority Data

Feb. 19, 2019 (KR) .......................... 10-2019-0019004

(51) Int. Cl.
*G06F 3/044* (2006.01)

(52) U.S. Cl.
CPC .. *G06F 3/0446* (2019.05); *G06F 2203/04112* (2013.01)

(58) Field of Classification Search
CPC .............. G06F 3/0445; G06F 3/0446; G06F 2203/04103; G06F 2203/04112
See application file for complete search history.

(56) References Cited

U.S. PATENT DOCUMENTS 10,013,127 B2 7/2018 Choi et al.
10,062,865 B2 8/2018 Lee et al.
(Continued)

FOREIGN PATENT DOCUMENTS

| KR | 10-2017-0028085 | 3/2017 |
| KR | 10-2017-0098489 | 8/2017 |
| KR | 10-2017-0121674 | 11/2017 |

OTHER PUBLICATIONS

Jinguang Cai, Recent advances in antireflective surfaces based on nanostructure arrays, Materials Horizons, 2015, 2, pp. 37-53.
(Continued)

*Primary Examiner* — Robert J Michaud
(74) *Attorney, Agent, or Firm* — F. Chau & Associates, LLC

(57) ABSTRACT

Provided is a display device, including a display panel. An input sensing panel is disposed on the display panel. The input sensing panel includes a plurality of first sensor units arranged along a first direction. A first connection unit is configured to connect the first sensor units. A plurality of second sensor units are arranged along a second direction crossing the first direction. A second connection unit is configured to connect the second sensor units. A first insulation layer is disposed between the first connection unit and the second connection unit. A second insulation layer covers the first insulation layer. A plurality of holes is provided on an upper surface of the second insulation layer, and a thickness of the second insulation layer is greater than a depth of each of the plurality of holes.

20 Claims, 14 Drawing Sheets

(56) References Cited

U.S. PATENT DOCUMENTS

2014/0239267 A1* 8/2014 Byun ............... H01L 29/78696
                                                        257/40
2017/0308196 A1   10/2017 Jeong et al.
2017/0353181 A1* 12/2017 Kim ..................... G06F 3/044
2018/0097204 A1   4/2018 Ivan et al.

OTHER PUBLICATIONS

Moth-Eye Mimicking By Electrochemical Oxidation of Aluminum by Malgorzata Norek, Science trends, Malgorzata Norek on Mar. 1, 2018.

* cited by examiner

FIG. 2A
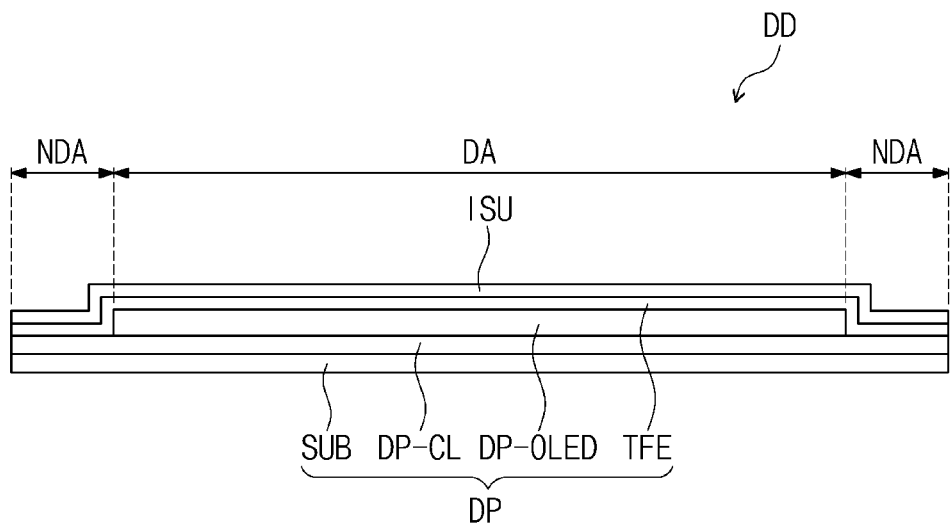
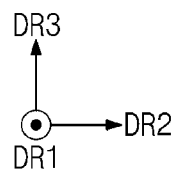
FIG. 2B
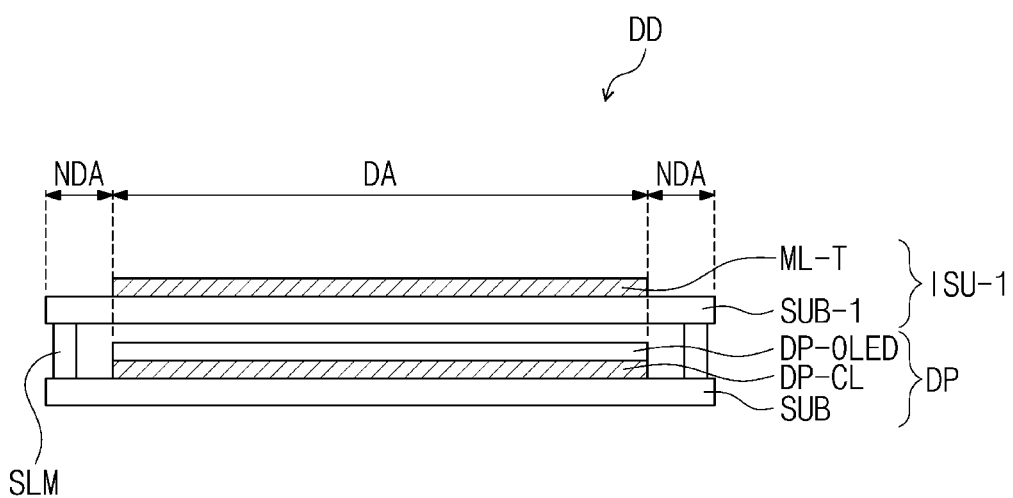
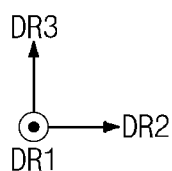

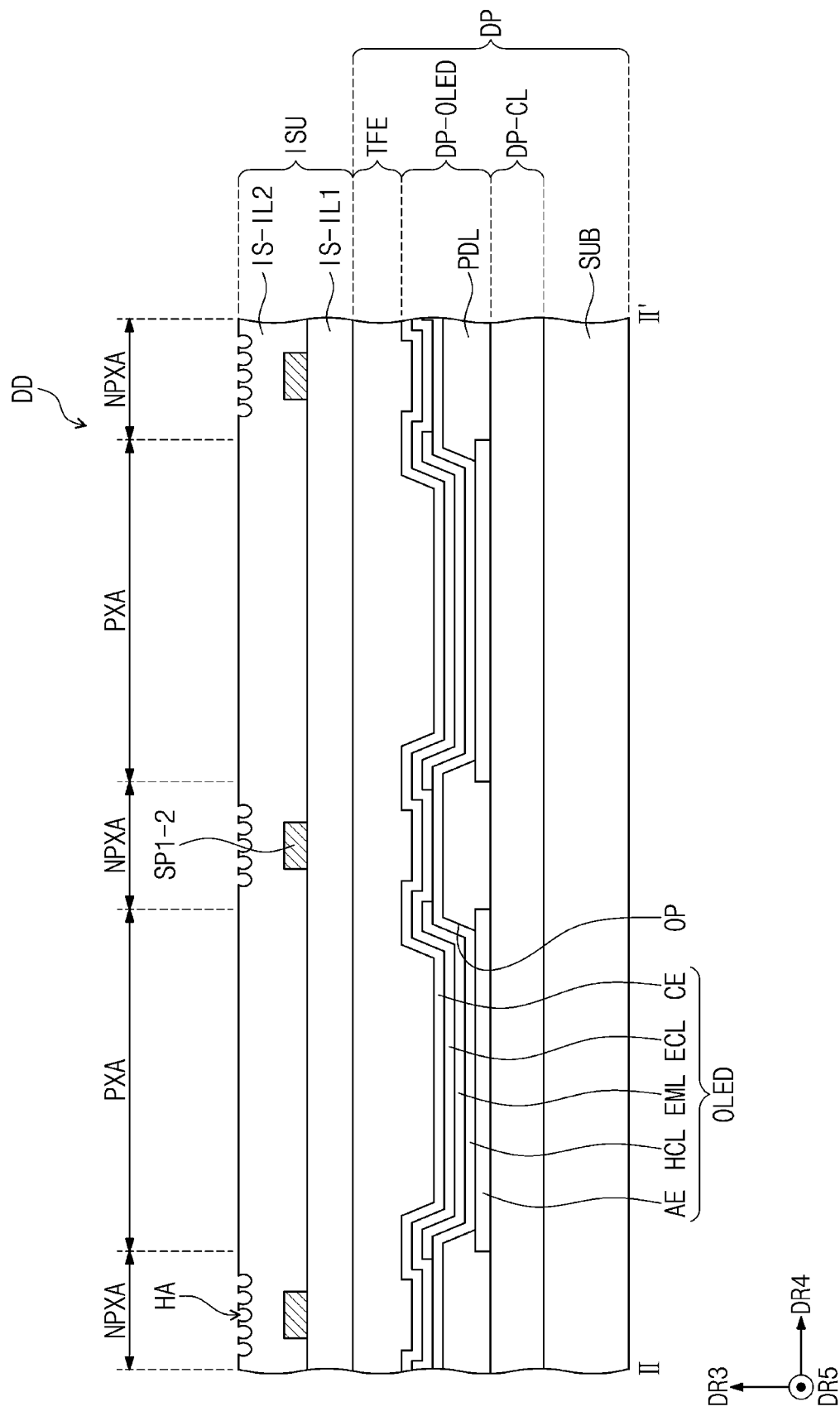

FIG. 11C
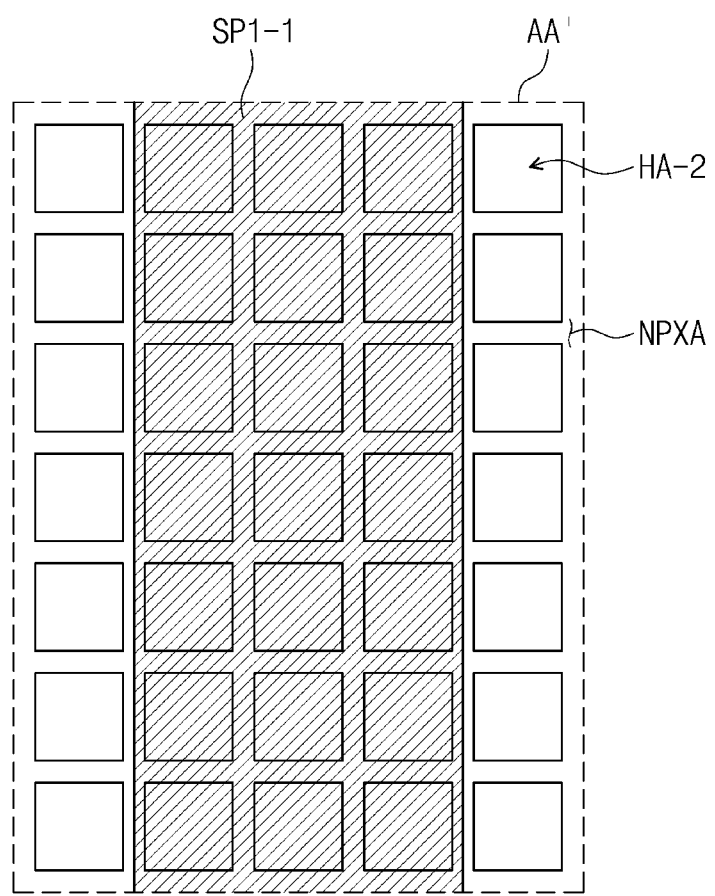
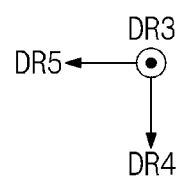

INPUT SENSING PANEL INCLUDING A PLURALITY OF HOLES AND A DISPLAY DEVICE HAVING THE SAME

CROSS-REFERENCE TO RELATED APPLICATION

This U.S. non-provisional patent application claims priority under 35 U.S.C. § 119 to Korean Patent Application No. 10-2019-0019004, filed on Feb. 19, 2019, the disclosure of which is incorporated by reference herein in its entirety.

1. TECHNICAL FIELD

The present disclosure provided herein relates to an input sensing panel including a plurality of holes and a display device including the same.

2. DISCUSSION OF RELATED ART

An electronic device which provides images to a user, such as a smart phone, a digital camera, a notebook computer, a navigation system, and a smart television, includes a display device for displaying an image. The display device may include a display panel which generates and displays images, and an input device such as a keyboard, a mouse, or a touch panel.

The touch panel is disposed on an upper portion of the display panel, and when a user touches the touch panel, an input signal is generated. The input signal generated from the touch panel is provided to the display panel, and the display panel may provide an image corresponding to the input signal in response to the input signal provided from the touch panel.

However, external light reflected off a display panel may render interior components visible to the user.

SUMMARY

The present disclosure provides for an input sensing panel having improved display surface characteristics and a display device including the same.

According to an exemplary embodiment of the present invention, a display device is provided including a display panel. An input sensing panel is disposed on the display panel. The input sensing panel includes a plurality of first sensor units arranged along a first direction. A first connection unit is configured to connect the first sensor units. A plurality of second sensor units are arranged along a second direction crossing the first direction. A second connection unit is configured to connect the second sensor units. A first insulation layer is disposed between the first connection unit and the second connection unit. A second insulation layer covers the first insulation layer. A plurality of holes is provided on an upper surface of the second insulation layer, and a thickness of the second insulation layer is greater than a depth of each of the plurality of holes.

According to an exemplary embodiment of the present invention, at least a portion of the plurality of holes overlaps the first sensor unit or the second sensor unit in a thickness direction.

According to an exemplary embodiment of the present invention, each of the first sensor units and each of the second sensor units comprise first mesh lines and second mesh lines crossing the first mesh lines.

According to an exemplary embodiment of the present invention at least some of the plurality of holes overlap the first mesh lines or the second mesh lines.

According to an exemplary embodiment of the present invention, a width of each of the plurality of holes is smaller than a width of each of the first mesh lines and a width of each of the second mesh lines.

According to an exemplary embodiment of the present invention, the first insulation layer includes an inorganic material.

According to an exemplary embodiment of the present invention, the first insulation layer includes an organic material.

According to an exemplary embodiment of the present invention, each of the plurality of holes has a substantially circular shape.

According to an exemplary embodiment of the present invention, each of the plurality of holes has a substantially polygonal shape.

According to an exemplary embodiment of the present invention the display panel comprises a light emitting region and a non-light emitting region adjacent to the light emitting region, and the plurality of holes does not overlap the light emitting region.

According to an exemplary embodiment of the present invention, the plurality of holes overlaps the non-light emitting region.

According to an exemplary embodiment of the present invention, at least a portion of each of the plurality of holes overlaps the first connection unit and/or the second connection unit.

According to an exemplary embodiment of the present invention, the second insulation layer includes an inorganic material.

According to an exemplary embodiment of the present invention, the second insulation layer includes an organic material.

According to an exemplary embodiment of the present invention, an input sensing panel is provided including a plurality of first sensor units arranged along a first direction. A first connection unit is configured to connect adjacent first sensor units among the plurality of first sensor units. A plurality of second sensor units are arranged along a second direction crossing the first direction. A second connection unit is disposed on the first connection unit and configured to connect adjacent second sensor units among the plurality of second sensor units. A first insulation layer is disposed between the first connection unit and the second connection unit. A second insulation layer covers the first sensor units, the second sensor units, and the second connection unit. A plurality of holes is provided on an upper surface of the second insulation layer, and the first sensor units and the second sensor units have a mesh shape. The plurality of holes overlap the first sensor units and the second sensor units.

According to an exemplary embodiment of the present invention, a thickness of a portion of the second insulation layer disposed on the first sensor units and the second sensor units is greater than a depth of each of the plurality of holes.

According to an exemplary embodiment of the present invention, the first insulation layer includes an inorganic material.

According to an exemplary embodiment of the present invention, the first insulation layer includes an organic material.

According to an exemplary embodiment of the present invention, the second insulation layer includes an inorganic material.

According to an exemplary embodiment of the present invention, the second insulation layer includes an organic material.

BRIEF DESCRIPTION OF THE FIGURES

The above and other features of the present invention will become more apparent with reference to the following Detailed Description when considered in conjunction with the attached drawings in which:

FIG. 2A and FIG. 2B are cross-sectional views illustrating a display device according to an exemplary embodiment of the present invention;

FIG. 9 is a cross-sectional view illustrating a display device taken along line II-II' illustrated in FIG. 8;

FIG. 11A to FIG. 11C are enlarged plan views illustrating region AA' illustrated in FIG. 8 according to exemplary embodiments of the present invention.

DETAILED DESCRIPTION

Figure 1:
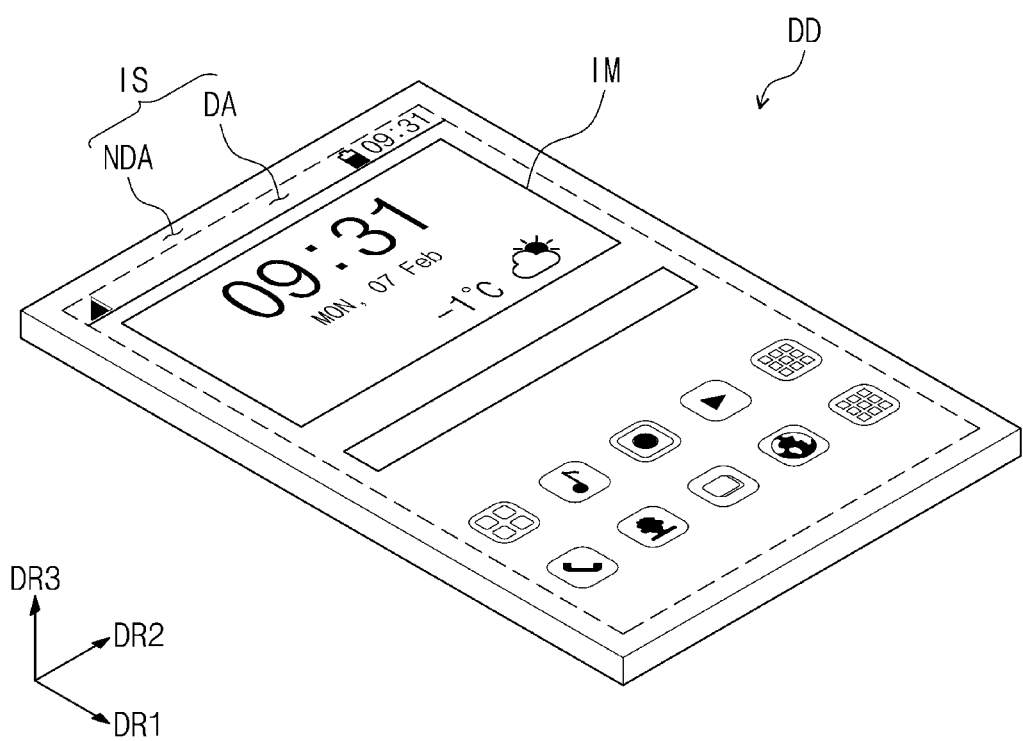
FIG. 1 is a perspective view illustrating a display device according to an exemplary embodiment of the present invention.

Exemplary embodiments of the present invention will now be described more fully hereinafter with reference to the accompanying drawings. When an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals may refer to like elements throughout the drawings and Detailed Description. Also, in the drawings, the thickness, the ratio, and the dimensions of elements may be exaggerated for an effective description of technical contents.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

Unless otherwise defined, all terms (including technical and scientific terms) used herein have the same meaning as commonly understood by one of ordinary skill in the art to which the present invention pertains. It is also to be understood that terms defined in commonly used dictionaries should be interpreted as having meanings consistent with the meanings in the context of the related art, and are expressly defined herein unless they are interpreted in an ideal or overly formal sense.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof. In contrast, the phrase "consisting of" is intended to preclude the presence or addition of other features.

Hereinafter, exemplary embodiments of the present invention will be described with reference to the accompanying drawings.

FIG. 1 is a perspective view of a display device according to an embodiment of the present invention.

Referring to FIG. 1, a display device DD may display an image IM through a display region DA of a display surface IS in a third direction (e.g. a DR3 direction). The display surface IS is in a plane defined by a first direction (e.g., a DR1 direction) and a second direction (e.g., a DR2 direction). The normal direction of the display surface IS, also referred to herein as a thickness direction of the display device DD, may be defined in a third direction (e.g., the DR3 direction).

Hereinafter, a first direction to a third direction refer to the same directions indicated by the first to third direction DR1, DR2, and DR3, respectively. In addition, a surface defined by the first direction DR1 and the second direction DR2 is defined as a plane, and "viewed on a plane" may be defined as being viewed from the third direction DR3.

The third direction DR3 may be a direction orthogonal to the plane defined by the first direction DR1 and the second direction DR2. The first direction DR1, the second direction DR2, and the third direction DR3 may be perpendicular to each other.

In an exemplary embodiment of the present invention, the display device DD is provided with a planar display surface. However, the present invention is not limited thereto. The display device DD may include a curved display surface or a three-dimensional display surface. The three-dimensional display surface may include a plurality of display regions arranged in different directions. For example, the three-dimensional display surface may include a polygonal columnar display surface.

The display device DD may be a rigid display device. However, the present invention is not limited thereto. For example, the display device DD may include a flexible display device DD. The display device DD applicable to a cellphone terminal is shown for illustrative purposes. The cellphone terminal may be constituted by disposing a main board, on which an electronic module, a camera module, a power module and the like are mounted, on a bracket/case together with the display device DD. The display device DD according to the present invention may be applicable to a large-sized display device such as a television and a monitor or to a small-and-medium-sized display device such as a tablet computer, a car navigation system, a game machine, and a smart watch.

The display surface IS includes the display region DA on which the image IM is displayed and a non-display region NDA adjacent to the display region DA. The non-display region NDA is a region on which the image IM is not displayed. In FIG. 1, as an example of the image IM, application icons are illustrated.

The display region DA may have a quadrangular shape. The non-display region NDA may at least partially surround the display region DA. However, the present invention is not limited thereto. For example, the shape of the display region DA and the shape of the non-display region NDA may be correlatively designed.

FIG. 2A is a cross-sectional view of a display device according to an embodiment of the present invention.

Referring to FIG. 2A, the display device DD may include a display panel DP and an input sensing panel ISU at least partially overlapping the display panel DP.

The display panel DP may be a light emitting type display panel, but is not particularly limited thereto. For example, the display panel DP may be an organic light emitting display panel or a quantum dot light emitting display panel. A light emitting layer of the organic light emitting display panel may include an organic light emitting material. A light emitting layer of a quantum dot light emitting display panel may include a quantum dot, a quantum load, and the like. Hereinafter, the display panel DP may be described as an organic light emitting display panel.

The display panel DP includes a base layer SUB, a circuit layer DP-CL, a display element layer DP-OLED, and a thin film encapsulation layer TFE sequentially stacked. However, the order of aforementioned layers of the display panel DP may be variously changed. The display panel DP will be described in further detail below.

The input sensing panel ISU may be conformally disposed on an upper surface of the display panel DP. The input sensing panel ISU obtains the coordinate information of an externally applied input. In an exemplary embodiment of the present invention, the input sensing panel ISU may be directly disposed on one surface of the display panel DP. For example, the input sensing panel ISU is disposed directly on the thin film encapsulation layer TFE. The input sensing panel ISU may be integrated with the display panel DP in an on-cell manner. The input sensing panel ISU and the display panel DP may be manufactured in a single continuous process. The input sensing panel ISU may include a touch panel.

FIG. 2B is a cross-sectional view of a display device DD according to an exemplary embodiment of the present invention. The same reference numerals are given to the elements described with reference to FIG. 2A, and the descriptions thereof are omitted.

Referring to FIG. 2B, the display device DD includes the display panel DP, an input sensing panel ISU-1, and a coupling member SLM.

The input sensing panel ISU-1 is disposed on the display panel DP. The input sensing panel ISU-1 obtains the coordinate information of an externally applied input. The input sensing panel ISU-1 may be manufactured in a separate process, and then adhered to the display panel DP. The input sensing panel ISU-1 may include a touch panel.

The input sensing panel ISU-1 may include a base layer SUB-1 and a sensing circuit layer ML-T.

The base layer SUB-1 is disposed on the light emitting element layer DP-OLED. A predetermined space is defined between the base layer SUB-1 and the light emitting element layer DP-OLED. The space may be filled with air and/or inert gas. According to an exemplary embodiment of the present invention, the space may be filled with a filler such as a silicone-based polymer, an epoxy-based resin, and/or an acrylic resin. The base layer SUB-1 may include a silicon substrate, a plastic substrate, a glass substrate, an insulation film, and/or a laminated structural body including a plurality of insulation layers.

The sensing circuit layer M L-T is disposed on the base layer SUB-1. The sensing circuit layer ML-T includes a plurality of insulation layers and a plurality of conductive layers. The plurality of conductive layers constitute a sensing electrode configured that senses an externally applied input, a sensing wiring connected to the sensing electrode, and a sensing pad connected to the sensing wiring.

The coupling member SLM is disposed between the base layer SUB of the display panel DP and the base layer SUB-1 of the sensing circuit layer ML-T. The coupling member SLM couples the base layer SUB of the display panel DP and the base layer SUB-1 of the sensing circuit layer ML-T. The coupling member SLM may include an organic matter such as a photo-curable resin, a photo-plastic resin, and/or an inorganic matter such as frit seal, but is not limited thereto.

Figure 3:
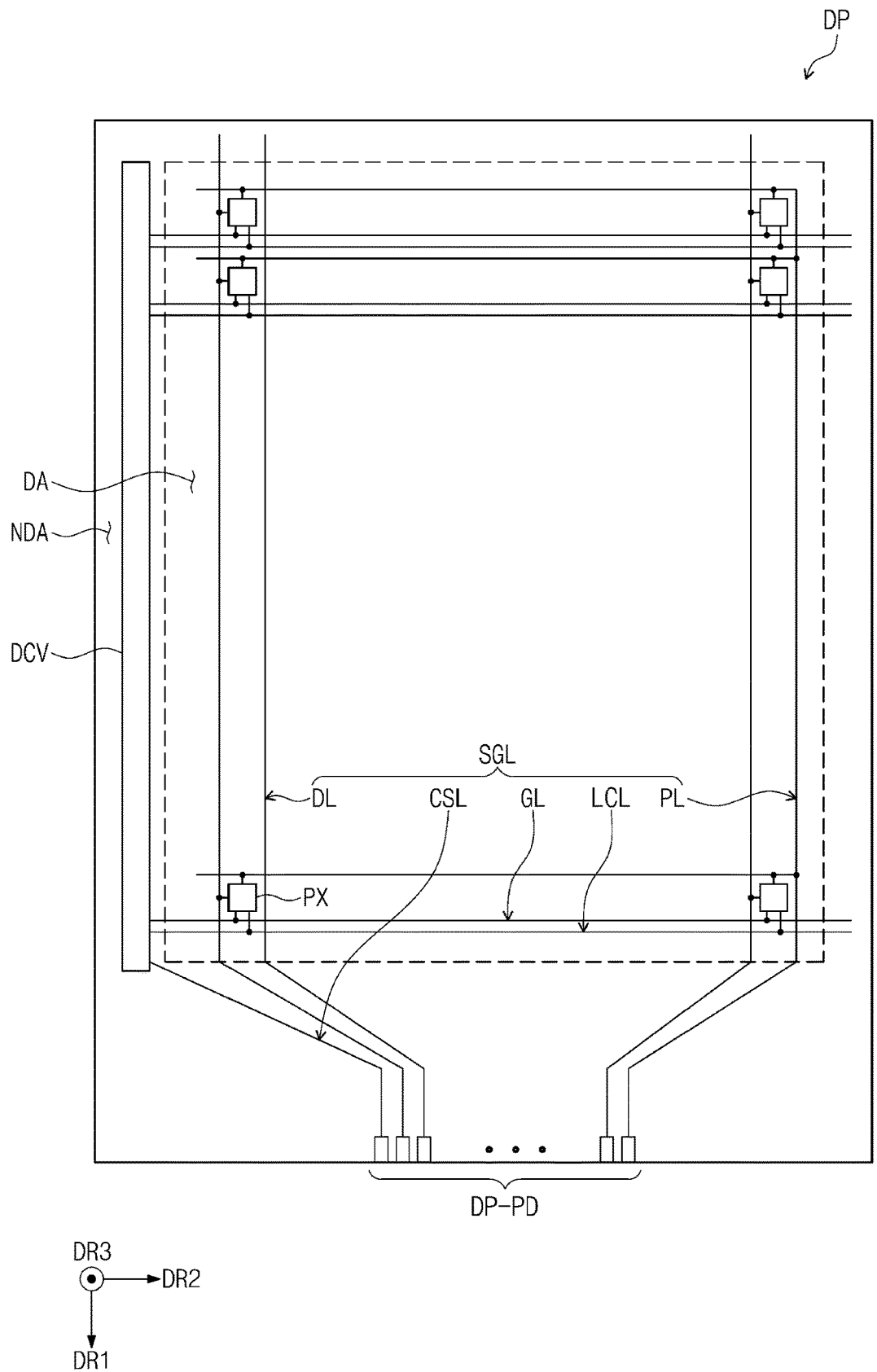
FIG. 3 is a plan view illustrating a display panel according to an exemplary embodiment of the present invention.

FIG. 3 is a plan view of a display panel according to an exemplary embodiment of the present invention.

Referring to FIG. 3, the display panel DP includes a scan driving circuit DCV, signal lines SGL, driving pads DP-PD, and pixels PX. A region on which the pixels PX are disposed may be defined as the display region DA.

The scan driving circuit DCV is disposed on the non-display region NDA. The scan driving circuit DCV generates scan signals. The scan signals may be sequentially output to gate lines GL. The scan driving circuit DCV may further output another control signal to a driving circuit of the pixels PX.

The scan driving circuit DCV may include thin film transistors formed through the same process as the process of the driving circuit of the pixels PX. For example, the process may include a low temperature polycrystalline silicon (LTPS) process or a low temperature polycrystalline oxide (LTPO) process.

The signal lines SGL may include a conductive material. The signal lines SGL may include a metal material having flexibility to minimize damage when the base layer SUB (see FIG. 2A) is bent. For example, each of the signal lines SGL may include a conductive material having excellent ductility, such as gold (Au), silver (Ag), aluminum (Al), and/or copper (Cu). However, a constituent material of the signal lines SGL is not limited thereto. The signal lines SGL may be formed of various other conductive materials used in manufacturing the display device DD (see FIG. 1).

The signal lines SGL include data lines DL, a power line PL, a control signal line CSL, gate lines GL, and light emitting control lines LCL.

The data lines DL are extended in the first direction DR1. The data lines DL may be respectively connected to a corresponding pixel PX among the pixels PX. Each of the pixels PX are connected to a corresponding date line DL among the data lines DL.

The power line PL is connected to the pixels PX.

The control signal line CSL provides control signals to the scan driving circuit DCV.

The gate lines GL extend in the second direction DR2. The second direction DR2 may orthogonally intersect the first direction DR1. The gate lines GL are respectively connected to a corresponding pixel PX among the pixels PX. The gate lines GL are connected to the scan driving circuit DCV.

The light emitting control lines LCL are extended in the second direction DR2. The light emitting control lines LCL are be respectively connected to a corresponding pixel PX among the pixels PX. The light emitting control lines LCL are connected to the scan driving circuit DCV.

Some of the data lines DL, the power line PL, the control signal lines CSL, the gate lines GL, and the light emitting control lines LCL may be disposed on the same layer and others thereof may be disposed on a different layer.

The driving pads DP-PD are electrically connected to the data lines DL, the power line PL, and the control signal line CSL. The driving pads DP-PD overlap the non-display region NDA.

Figure 4:
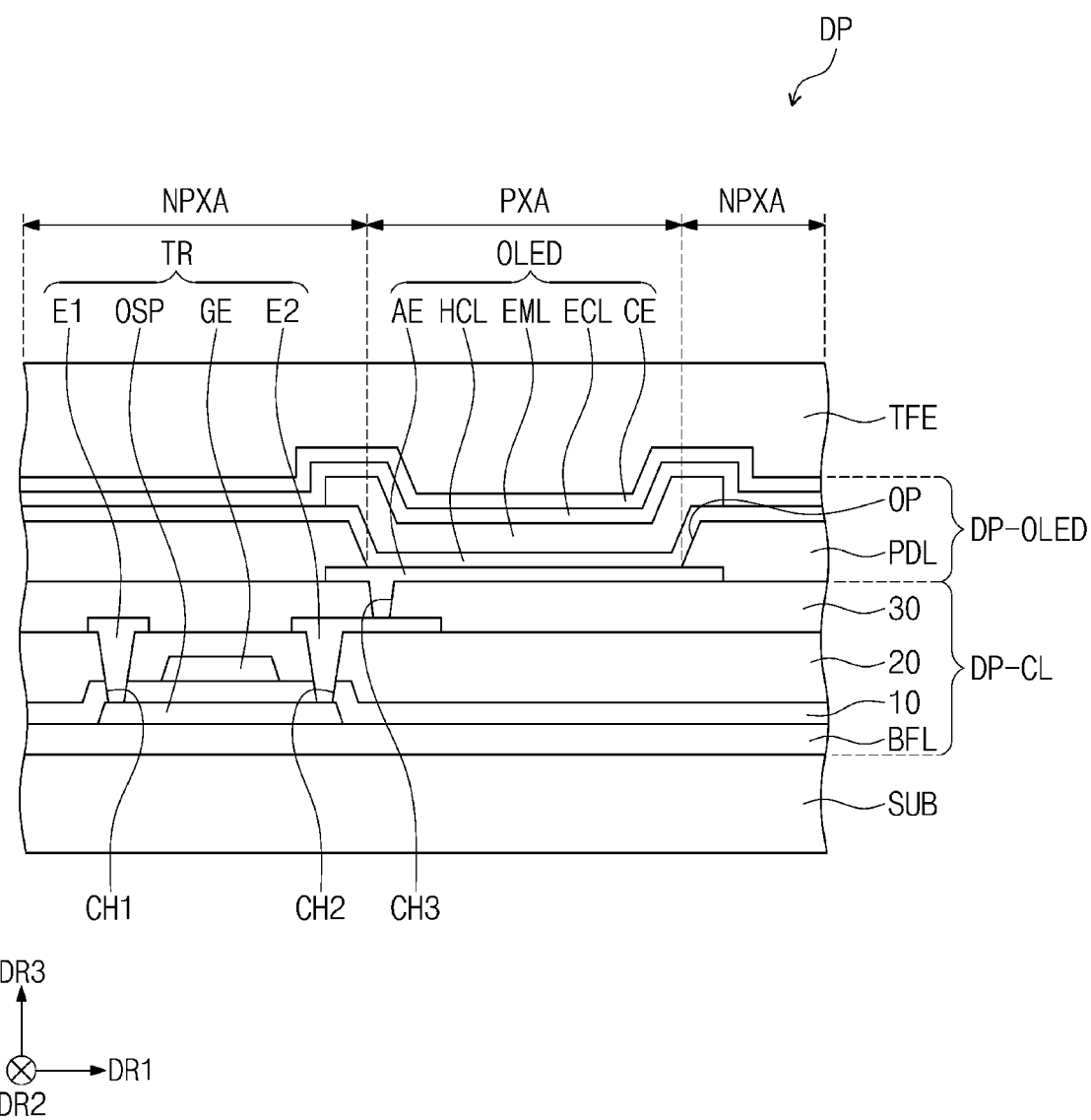
FIG. 4 is a cross-sectional view illustrating a display panel according to an exemplary embodiment of the present invention.

FIG. 4 is a cross-sectional view of a display panel according to an exemplary embodiment of the present invention.

Referring to FIG. 4, the circuit layer DP-CL, the display element layer DP-OLED, and the thin film encapsulation layer TFE may be sequentially disposed on the base layer SUB. However, the order of the aforementioned layers is not necessarily limited thereto.

The base layer SUB may include a silicon substrate, a plastic substrate, a glass substrate, an insulation film, and/or a laminated structural body including a plurality of insulation layers.

The circuit layer DP-CL may include the signal lines SGL (see FIG. 3). The circuit layer DP-CL may include a buffer film BFL which is an inorganic film, a first intermediate inorganic film 10 which is an inorganic film, a second intermediate inorganic film 20 which is an inorganic film, and an intermediate organic film 30 which is an organic film sequentially stacked. However, the materials and order of the aforementioned buffer film BFL, inorganic films 10 and 20, and organic film 30 are not particularly limited.

The buffer film BFL forms a smooth surface on an upper portion of the base layer SUB, and prevents the penetration of impurity elements into the base layer SUB. According to an exemplary embodiment of the present invention, the buffer film BFL may be selectively disposed/omitted.

On the buffer film BFL, a semiconductor pattern OSP of a transistor TR is disposed. The semiconductor pattern OSP may include polysilicon and/or amorphous silicon. In addition, the semiconductor pattern OSP may include, for example, a metal oxide semiconductor.

On the semiconductor pattern OSP, a portion of the first intermediate inorganic film 10 may be disposed. On the portion of the first intermediate inorganic film 10, a control electrode GE of the transistor TR may be disposed.

On the first intermediate inorganic film 10, the second intermediate inorganic film 20 covering the control electrode GE is disposed. On the second intermediate inorganic film 20, a first electrode E1 and a second electrode E2 of the transistor TR are disposed.

The first electrode E1 and the second electrode E2 are respectively connected to ends of the semiconductor pattern OSP through a first through-hole CH1 and a second through-hole CH2 passing through the first intermediate inorganic film 10 and the second intermediate inorganic film 20. According to an exemplary embodiment of the present invention, the transistor TR may be transformed into a bottom gate structure and implemented.

On the second intermediate inorganic film 20, the intermediate organic film 30 covering the first electrode E1 and the second electrode E2 is disposed. The intermediate organic film 30 may provide a flat surface.

On the intermediate organic film 30, the light emitting element layer DP-OLED is disposed. The light emitting element layer DP-OLED includes a pixel defining film PDL and a light emitting device OLED. For example, the light emitting device OLED may include an organic light emitting diode. The pixel defining film PDL may include an organic material.

On the intermediate organic film 30, a first electrode AE is disposed. The first electrode AE is electrically connected to the second electrode E2 through a third through-hole CH3 passing through the intermediate organic film 30.

On the pixel defining film PDL, an opening OP is defined. The opening OP of the pixel defining film PDL exposes at least a portion of the first electrode AE.

A hole control layer HCL is commonly disposed in the light emitting region PXA and the non-light emitting region NPXA. On the hole control layer HCL, a light emitting layer EML is disposed. The light emitting layer EML may be disposed in a region corresponding to the opening OP. The light emitting layer EML may include an organic material and/or an inorganic material. The light emitting layer EML may generate a predetermined color of light.

On the light emitting layer EML, an electron control layer ECL is disposed. On the electron control layer ECL, a second electrode CE is disposed.

On the second electrode CE, the thin film encapsulation layer TFE is disposed. The thin film encapsulation layer TFE covers the second electrode CE. The thin film encapsulation layer TFE may include at least one insulation layer. For example, the thin film encapsulation layer TFE may include at least one encapsulation inorganic film. For example, the thin film encapsulation layer TFE may include at least one encapsulation organic film and at least one encapsulation inorganic film. The thin film encapsulation layer TFE may be provided as a single encapsulation layer, or may be provided as a plurality of thin films.

Between the thin film encapsulation layer TFE and the second electrode CE, a capping layer covering the second electrode CE may be further disposed. For example, the thin film encapsulation layer TFE may directly cover the capping layer.

Figure 5:
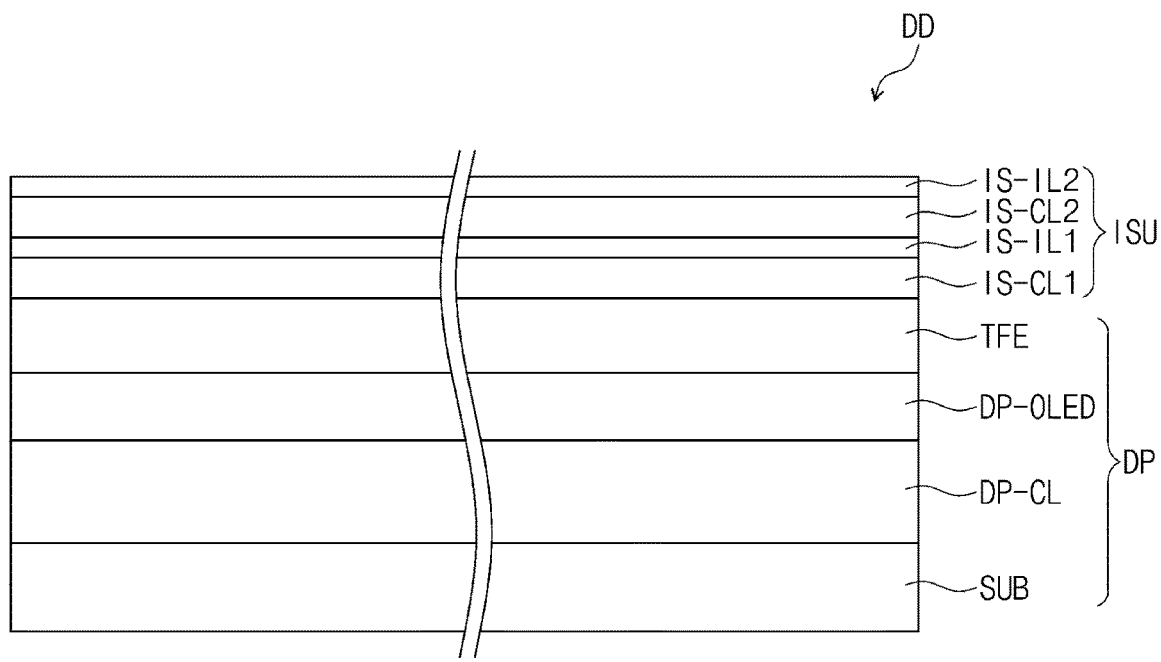
FIG. 5 is a cross-sectional view illustrating a display device according to an exemplary embodiment of the present invention.

FIG. 5 is a cross-sectional view of a display device according to an exemplary embodiment of the present invention.

Referring to FIG. 5, the input sensing panel ISU is disposed on the display panel DP. The input sensing panel ISU may have a multi-layered structure. The input sensing panel ISU may include a sensing electrode, a signal line connected to the sensing electrode, and at least one insulation layer. The input sensing panel ISU may sense an externally applied input. For example, the input sensing panel ISU may detect an externally applied input in a capacitive manner. However, the present invention is not limited thereto. According to an exemplary embodiment of the present invention, the input sensing panel ISU may sense an externally applied input using an electromagnetic inductive method or in a pressure sensing method.

The input sensing panel ISU includes a first conductive layer IS-CL1, a first insulation layer IS-IL1, a second conductive layer IS-CL2, and a second insulation layer IS-IL2 sequentially stacked. However, the order of the various layers of the input sensing panel ISU is not limited thereto. Each of the first conductive layer IS-CL1 and the second conductive layer IS-CL2 may have a single-layered structure, or a multi-layered structure in which layers are laminated along the third direction DR3. A conductive layer of a single-layered structure may include a metal layer and/or a transparent conductive layer. The metal layer may include molybdenum, silver, titanium, copper, aluminum, and/or an alloy thereof. The transparent conductive layer may include a transparent conductive oxide such as indium tin oxide (ITO), indium zinc oxide (IZO), zinc oxide (ZnO), and/or indium tin zinc oxide (ITZO). In addition, the transparent conductive layer may include a conductive polymer such as PEDOT, a metal nanowire and/or graphene.

A conductive layer having a multi-layered structure may include multi-layered metal layers. The multi-layered metal layers may have, for example, a three-layered structure of titanium/aluminum/titanium. The conductive layer having a multi-layered structure may include at least one metal layer and at least one transparent conductive layer.

Each of the first conductive layer IS-CL1 and the second conductive layer IS-CL2 may include a plurality of patterns. Hereinafter, the first conductive layer IS-CL1 is described as including first conductive patterns, and the second conductive layer IS-CL2 is described as including second conductive patterns. Each of the first conductive patterns and the second conductive patterns may include sensing electrodes and signal lines.

The lamination structure and materials of the sensing electrodes may be determined in consideration of sensing sensitivity. An RC delay may affect the sensing sensitivity, and since sensing electrodes including a metal layer have a smaller resistance than those including a transparent conductive layer, an RC delay value may be reduced. Accordingly, the charging time of capacitors defined between the sensing electrodes may be reduced. The sensing electrodes including a transparent conductive layer are not visible to a user as compared with those including a metal layer, and an input area may be increased to increase capacitance.

The sensing electrodes including a metal layer may have a mesh shape. The thickness of the thin film encapsulation layer TFE may be controlled such that noise generated by components of the light emitting element layer DP-OLED do not affect the input sensing panel ISU.

Each of the first insulation layer IS-IL1 and the second insulation layer IS-IL2 may have a single-layered structure or a multi-layered structure. Each of the first insulation layer IS-IL1 and the second insulation layer IS-IL2 may include an inorganic matter or an organic matter, or a composite material.

Figure 6:
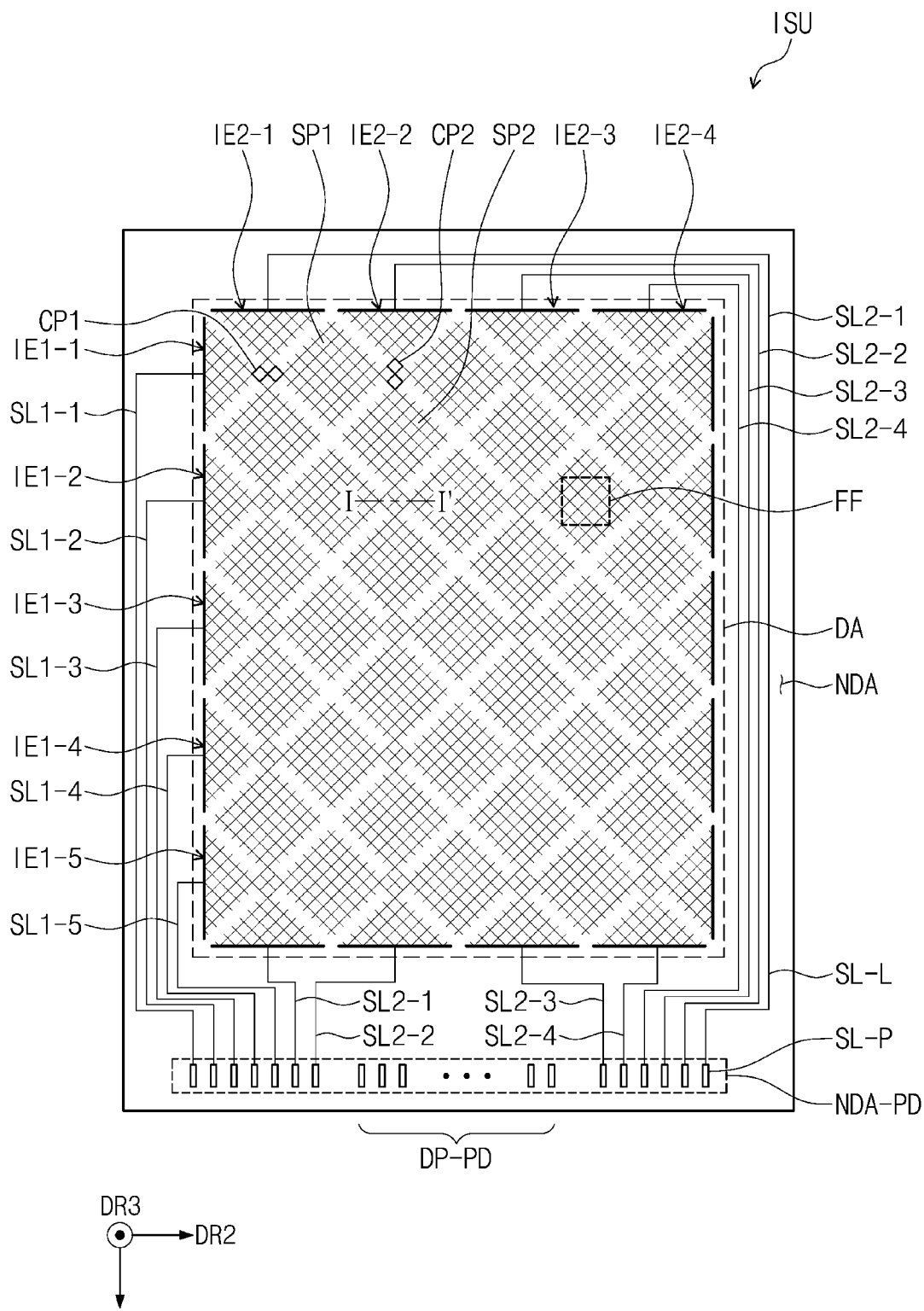
FIG. 6 is a plan view illustrating an input sensing panel according to an exemplary embodiment of the present invention.

FIG. 6 is a plan view of an input sensing panel according to an exemplary embodiment of the present invention.

Referring to FIG. 6, the input sensing panel ISU includes first sensing electrodes IE1-1 to IE1-5, first signal lines SL1-1 to SL1-5 respectively connected to the first sensing electrodes IE1-1 to IE1-5, second sensing electrodes IE2-1 to IE2-4, and second signal lines SL2-1 to SL2-4 respectively connected to the second sensing electrodes IE2-1 to IE2-4. The input sensing panel ISU may further include an optical dummy electrode disposed in a boundary region between the first sensing electrodes IE1-1 to IE1-5 and the second sensing electrodes IE2-1 to IE2-4.

The thin film encapsulation layer TFE (see FIG. 5) includes at least one encapsulation inorganic film, and may provide a planarized base surface. Accordingly, even if the components of the input sensing panel ISU are formed in a continuous process, the defect rate may be reduced. The first signal lines SL1-1 to SL1-5 and the second signal lines SL2-1 to SL2-4 are disposed in the non-display region NDA having a reduced step difference, and thus, may have a uniform thickness. Stress applied to a region overlapping the step difference of the first signal lines SL1-1 to SL1-5 and the second signal lines SL2-1 to SL2-4 may be reduced.

The first sensing electrodes IE1-1 to IE1-5 and the second sensing electrodes IE2-1 to IE2-4 cross each other.

The first sensing electrodes IE1-1 to IE1-S are arranged in the first direction DR1. Each of the first sensing electrodes IE1-1 to IE1-5 has a shape extended in the second direction DR2.

The second sensing electrodes IE2-1 to IE2-4 are arranged in the second direction DR2. The second sensing electrodes IE2-1 to IE2-4 have a shape extended in the first direction DR1.

The first sensing electrodes IE1-1 to IE1-5 and the second first sensing electrodes IE2-1 to IE2-4 sense an externally applied input using a mutual capacitative method or a self-capacitative method. Coordinates of an externally applied input may be calculated in the mutual cap manner during a first interval and coordinates of the externally applied input may be recalculated in the self-cap manner during a second interval.

Each of the first sensing electrodes IE1-1 to IE1-5 includes first sensor units SP1 and first connection units CP1. Each of the second sensing electrodes IE2-1 to IE2-4 includes second sensor units SP2 and second connection units CP2. Among the first sensor units SP1, two first sensor units SP1 disposed at opposite ends of a first sensing electrode may have a smaller size than a first sensor unit SP1 disposed in the center of the first sensing electrode. For example, outermost first sensor units SP1 may be half the size of a centrally disposed first sensor unit SP1. Among the second sensor units SP2, two second sensor units disposed at opposite ends of a second sensing electrode may have a smaller size than a second sensor unit disposed in the center. For example, outermost second sensor units SP2 may be half the size of a centrally disposed second sensor unit SP2.

Although the shapes of the first sensing electrodes IE1-1 to IE1-5 and the second sensing electrodes IE2-1 to IE2-4 are illustrated as linear rows and columns respectively, the shapes thereof are not limited thereto. According to an exemplary embodiment of the present invention, the first sensing electrodes IE1-1 to IE1-5 and the second sensing electrodes IE2-1 to IE2-4 may have a shape in which a sensor unit and a connection unit are not distinguished from each other (for example, a bar shape). The first sensor units SP1 and the second sensor units SP2 having a rhombic shape are illustrated, but the present invention is not limited thereto. The first sensor units SP1 and the second sensor units SP2 may have various polygonal shapes.

In one first sensing electrode from among the first sensing electrodes IE1-1 to IE1-5, the first sensor units SP1 may be arranged in the second direction DR2, and in one second sensing electrode from among the second sensing electrodes IE2-1 to IE2-4, the second sensor units SP2 are arranged in the first direction DR1. Each of the first connection units CP1 connect the first sensor units SP1 adjacent to each other, and each of the second connection units CP2 connect the second sensor units SP2 adjacent to each other.

The first signal lines SL1-L to SL1-5 are connected to one end of the first sensing electrodes IE1-1 to IE1-5, respectively. The second signal lines SL2-1 to SL2-4 may be connected to both ends of the second sensing electrodes IE2-1 to IE2-4, respectively. According to an exemplary embodiment of the present invention, the first signal lines SL1-1 to SL1-5 may also be connected to both ends of the first sensing electrodes IE1- to IE1-5. According to an exemplary embodiment of the present invention, the second signal lines SL2-1 to SL2-4 may be connected to only one end of the second sensing electrodes IE2-1 to IE2-4, respectively.

According to the present embodiment, sensing sensitivity may be increased when compared with the input sensing panel ISU including the second signal lines SL2-1 to SL2-4 connected to only one end of the second sensing electrodes IE2-1 to IE2-4, respectively. Since the second sensing electrodes IE2-1 to IE2-4 are longer than the first sensing electrodes IE1-1 to IE-5, a voltage drop of a detection signal (or a transmission signal) may occur, and thus, sensing sensitivity may deteriorate. According to the present embodiment, a detection signal (or a transmission signal) is provided through the second signal lines SL2-1 to SL2-4 connected to both ends of the second sensing electrodes IE2-1 to IE2-4, so that a voltage drop of the detection signal (or the transmission signal) may be prevented to prevent the deterioration of sensing sensitivity.

Each of the first signal lines SL1-1 to SL1-5 and the second signal lines SL2-1 to SL2-4 include line units SL-L and pad units SL-P. The pad units SL-P are arranged in a pad region NDA-PD. For example, the pad units SL-P are arranged in a second direction DR2.

The pad units SL-P may be disposed in different regions having the driving pads DP-PD disposed therebetween. Since two groups of the pad units SL-P are disposed spaced apart from each other, the connection of a circuit substrate may be facilitated and the configuration of the circuit substrate may become simplified.

According to an exemplary embodiment of the present invention, the position of the first signal lines SL1-1 to SL1-5 and the position of the second signal lines SL2-1 to SL2-4 may be switched. For example, the first signal lines SL1-1 to SL1-5 may be disposed on the left side of the input sensing panel ISU, and the second signal lines SL2- to SL2-4 may be disposed on the right side of the input sensing panel ISU.

The first sensing electrodes IE1-1 to IE1-5 and the second sensing electrodes IE2-1 to IE2-4 have a mesh shape.

The first sensing electrodes IE1-1 to IE1-5 and the second sensing electrodes IE2-1 to IE2-4 having a mesh shape may include silver, aluminum, copper, chromium, nickel and/or titanium, or the like applicable to a low-temperature process, but the embodiment of the present invention is not limited thereto. Even when the input sensing panel ISU is formed in a continuous process, the light emitting device OLED (see FIG. 4) may be prevented from being damaged.

Figure 7:
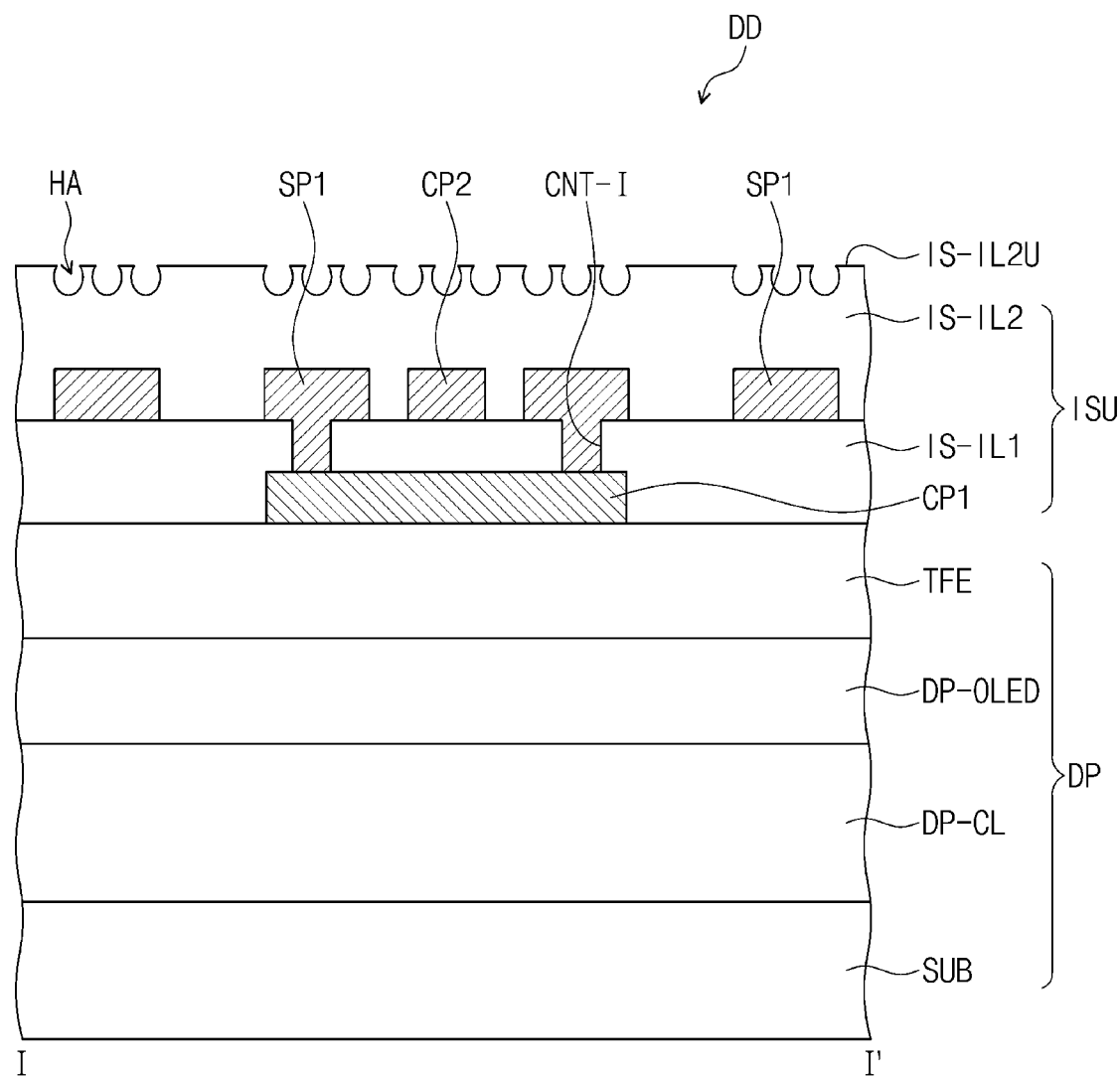
FIG. 7 is a cross-sectional view illustrating a display device taken along line I-I' illustrated in FIG. 6.

FIG. 7 is a cross-sectional view of a display device taken along line I-I' illustrated in FIG. 6.

Referring to FIG. 7, the input sensing panel ISU includes the first connection units CP1, the first insulation layer IS-IL1, the first sensor units SP1, the second connection units CP2, and the second insulation layer IS-IL2.

The first connection units CP1 are disposed on the thin film encapsulation layer TFE. The first connection units CP1 may be a component corresponding to the first conductive layer IS-CL1 of FIG. 5. The first connection units CP1 is electrically connected to the first sensor units SP1 through first connection contact holes CNT-1.

The first insulation layer IS-IL1 is disposed on the first connection units CP1. The first insulation layer IS-IL1 may cover the first connection units CP1. On the first insulation layer IS-IL1, the first connection contact holes CNT-1 may be defined.

The first insulation layer IS-IL1 may include an inorganic film. The inorganic film may include aluminum oxide, titanium oxide, silicon oxide, silicon oxynitride, silicon nitride, zirconium oxide, and/or hafnium oxide.

The first insulation layer IS-IL1 may include an organic film. The organic film may include an acrylic resin, a methacryl-based resin, polyisoprene, a vinyl-based resin, an epoxy-based resin, a urethane-based resin, a cellulose-based resin, a siloxane-based resin, a polyimide-based resin, a polyamide-based resin, and/or a perylene-based resin.

The first sensor units SP1 are disposed on the first insulation layer IS-IL1. The first sensor units SP1 may be a component corresponding to the second conductive layer IS-CL2 of FIG. 5. The first sensor units SP1 adjacent to each other are electrically connected through the first connection units CP1.

The second connection units CP2 are disposed on the first insulation layer IS-IL1. The second connection units CP2 are a component corresponding to the second conductive layer IS-CL2 of FIG. 5. The second connection units CP2 electrically connect the second sensor units SP2 (see FIG. 6).

The first connection units CP1 and the second connection units CP2 cross each other, and in order to reduce the influence of parasitic capacitance, a width measured on the plane of the first connection units CP1 may be minimized. In order to increase sensing sensitivity, the first connection units CP1 and the second connection units CP2 may include a material having low resistance. The first signal lines SL1-1 to SL1-5 (see FIG. 6) and the second signal lines SL2-1 to SL2-4 (see FIG. 6) may include the same metal material.

The second insulation layer IS-IL2 may be disposed on the first sensor units SP1 and the second connection units CP2. The second insulation layer IS-IL2 may cover the first sensor units SP1 and the second connection units CP2.

The second insulation layer IS-IL2 may include an inorganic film. The inorganic film may include aluminum oxide, titanium oxide, silicon oxide, silicon oxynitride, silicon nitride, zirconium oxide, and/or hafnium oxide.

The second insulation layer IS-IL2 may include an organic film. The organic film may include an acrylic resin, a methacryl-based resin, polyisoprene, a vinyl-based resin, an epoxy-based resin, a urethane-based resin, a cellulose-based resin, a siloxane-based resin, a polyimide-based resin, a polyamide-based resin, and/or a perylene-based resin.

On an upper surface IS-IL2U of the second insulation layer IS-IL2, a plurality of holes HA may be provided. The shapes of the plurality of holes HA may be circular with a depth that extends in the third direction DR3. However, the present invention is not limited thereto. The plurality of holes HA may have various shapes. For example, the shapes of the plurality of holes HA may be polygonal. At least a portion of the plurality of holes HA overlaps the first sensor units SP1 and the second sensor units SP2 (see FIG. 6). At least a portion of the plurality of holes HA overlap the first connection units CP1 and/or the second connection units CP2 in the third direction DR3.

When the second insulation layer IS-IL2 is an inorganic film, the plurality of holes HA may be formed by isotropic etching. When the second insulation layer IS-IL2 is an inorganic film, the plurality of holes HA may be formed by an isotropic etching process.

Figure 8:
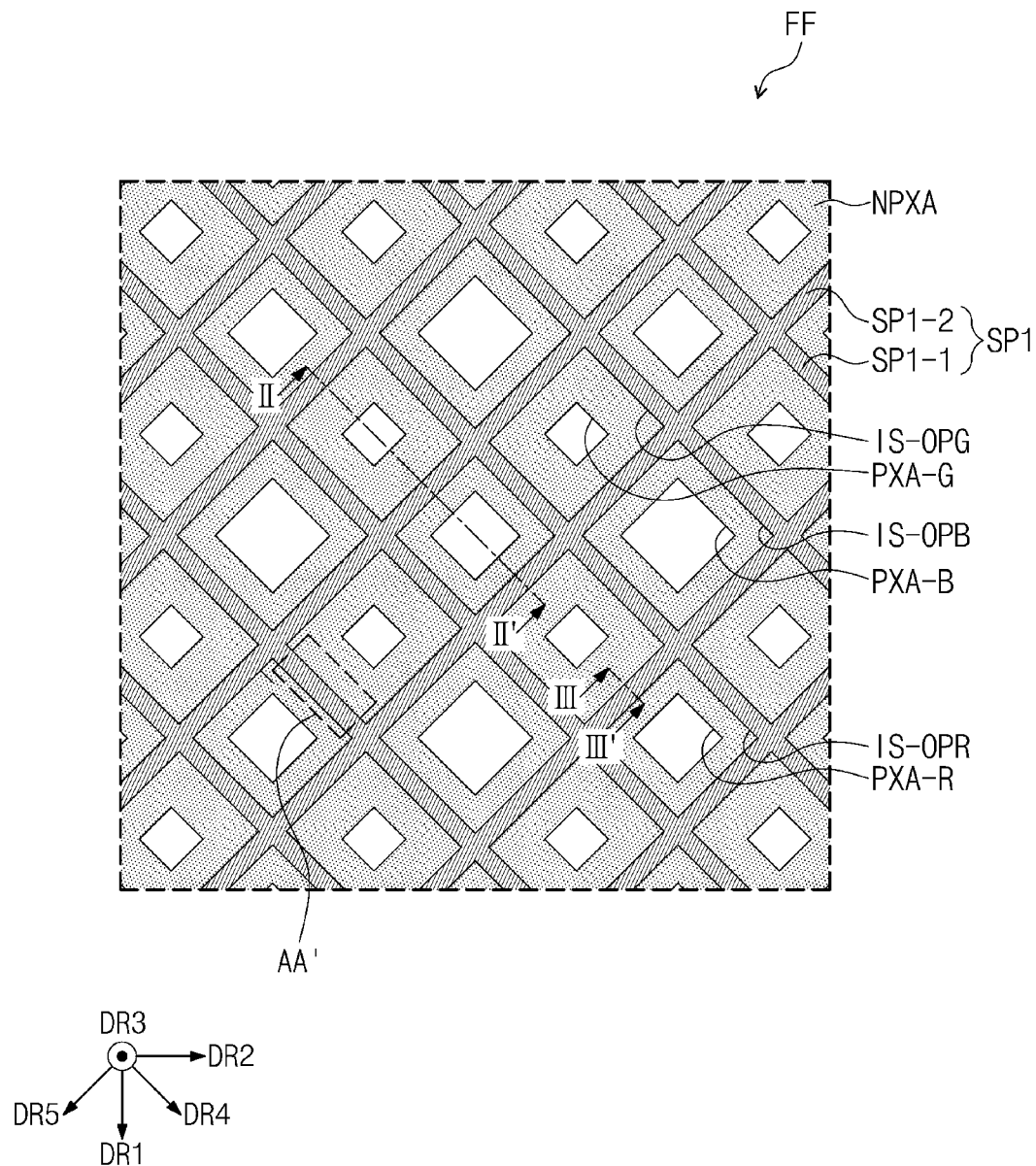
FIG. 8 is an enlarged plan view illustrating region FF of the input sensing panel illustrated in FIG. 6.

FIG. 8 is a plan view of an input sensing panel illustrating an enlarged view of region FF illustrated in FIG. 6.

Referring to FIG. 8, the first sensor units SP1 might not overlap light emitting regions PXA-R, PXA-G, and PXA-B, and may overlap the non-light emitting region NPXA.

Each of the first sensor units SP1 and the second sensor units SP2 (see FIG. 6) include first mesh lines SP1-1 and second mesh lines SP1-2. The first mesh lines SP1-1 extend in a fourth direction DR4 between the first direction DR1 and the second direction DR2. The second mesh lines SP1-2 extend in a fifth direction DR5 crossing the fourth direction DR4. For example, the fifth direction DR5 may be mirror symmetrical to the fourth direction DR4 across an axis parallel to the first direction DR1. The fourth direction DR4 and the fifth direction DR5 may be perpendicular to each other, but are not limited thereto.

The first mesh lines SP1-1 and the second mesh lines SP1-2 may have a single-layered structure, or a multi-layered structure in which layers are laminated along the third direction DR3. Each of the first mesh lines SP1-1 and the second mesh lines SP1-2 having a single-layered structure may include molybdenum, silver, titanium, copper, aluminum, and/or an alloy thereof. Each of the first mesh lines SP1-1 and the second mesh lines SP1-2 having a multi-layered structure may have a three-layered structure of titanium/aluminum/titanium.

The first mesh lines SP1-1 and the second mesh lines SP1-2 define mesh holes IS-OPR, IS-OPG, and IS-OPB. The mesh holes IS-OPR, IS-OPG, and IS-OPB may be in a respective one-to-one correspondence with the light emitting regions PXA-R, PXA-G, and PXA-B.

The light emitting regions PXA-R, PXA-G, and PXA-B may be classified into a plurality of groups according to the color of light generated from the light emitting device OLED (see FIG. 4). In FIG. 8, the light emitting regions PXA-R, PXA-G, and PXA-B classified into three groups according to the color of emitted light are illustrated.

The light emitting regions PXA-R, PXA-G, and PXA-B may have different areas according to the color of light emitted from the light emitting layer EML (see FIG. 4) of the light emitting device OLED (see FIG. 4). Depending on the type of the light emitting device OLED (see FIG. 4), the area of the light emitting regions PXA-R, PXA-G, and PXA-B may be determined.

The light emitting regions PXA-R, PXA-G, and PXA-B are exemplarily illustrated as having different areas from each other, but are not limited thereto. The light emitting regions PXA-R, PXA-G, and PXA-B may have the same size.

The mesh holes IS-OPR, IS-OPG, and IS-OPB are illustrated as being in a one-to-one correspondence with the light emitting regions PXA-R, PXA-G, and PXA-B, but are not limited thereto. Each of the mesh holes IS-OPR, IS-OPG, and IS-OPB may correspond to two or more light emitting regions PXA-R, PXA-G, and PXA-B.

The mesh holes IS-OPR, IS-OPG, and IS-OPB may be classified into a plurality of groups having different areas from each other. The mesh holes IS-OPR, IS-OPG, and IS-OPB may be classified into three groups according to the corresponding light emitting regions PXA-R, PXA-G, and PXA-B. According to an embodiment of the present invention, the areas of the mesh holes IS-OPR, IS-OPG, and IS-OPB may be the same.

The planar shape of each of the mesh holes IS-OPR, IS-OPG, and IS-OPB is not limited, and may have a polygonal shape other than a rhombus shape. The planar shape of each of the mesh holes IS-OPR, IS-OPG, and IS-OPB may be polygonal with rounded corners.

FIG. 9 is a cross-sectional view of a display device taken along line II-II' illustrated in FIG. 8.

Referring to FIG. 9, the display device DD includes the light emitting region PXA and the non-light emitting region NPXA adjacent to the light emitting region PXA.

The light emitting region PXA may be defined the same as each of the light emitting regions PXA-R, PXA-G, and PXA-B.

At least some of the plurality of holes HA overlap the first mesh lines SP1-1 (see FIG. 8) and the second mesh lines SP1-2 in the third direction DR3. For example, at least some of the plurality of holes HA may correspond to regions occupied by the first mesh lines SP1-1 and the second mesh lines SP1-2, when viewed in a plan view.

In a plan view, the plurality of holes HA might not overlap the light emitting region PXA.

In a plan view, the plurality of holes HA may overlap the non-light emitting region NPXA. For example, the plurality of holes HA may overlap portions of the non-light emitting region NPXA in which first or second mesh lines SP1-1 or SP1-2 are disposed.

Figure 10A:
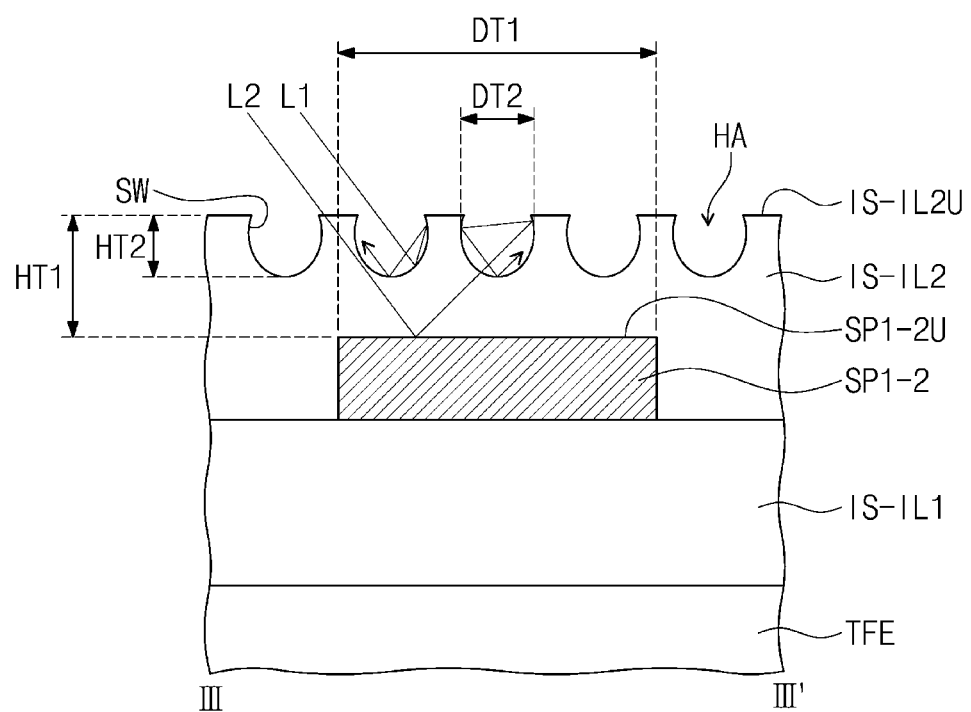
FIG. 10A and FIG. 10B are cross-sectional views illustrating a display device taken along line III-III' illustrated in FIG. 8.

FIG. 10A is a cross-sectional view of a display device taken along line III-III' illustrated in FIG. 8.

Referring to FIG. 10A, on the upper surface IS-IL2U of the second insulation layer IS-IL2, the plurality of holes HA are provided. The shapes of the plurality of holes HA are circular. A side wall SW of the second insulation layer IS-IL2 defining the plurality of holes HA may have a curvature.

A thickness HT1 is the distance in the third direction DR3 from an upper surface SP1-2U of the second mesh lines SP1-2 to the upper surface IS-IL2U of the second insulation layers IS-IL2, which is greater than a depth HT2 in the third direction DR3 of each of the plurality of holes HA.

A width DT1 of the second mesh lines SP1-2 in the fourth direction DR4 is greater than a width DT2 in the fourth direction DR4 of each of the plurality of holes HA.

At least some of the plurality of holes HA overlap the second mesh lines SP1-2 in the third direction DR3.

A first light L1 may be light incident on the display device DD (see FIG. 7). The first light L1 may be incident inside of one of the plurality of holes HA. The first light L1 may be reflected from the side wall SW of the second insulation layer IS-IL2 defining the holes HA. The first light L1 incident inside of one of the plurality of holes HA is reflected in a hole HA, and may not come outside the hole HA. According to an exemplary embodiment of the present invention, the inside of the plurality of holes may be coated with a material that absorbs visible light.

A second light L2 may be reflected by the first mesh lines SP1-1 (see FIG. 8) or the second mesh lines SP1-2. The reflected second light L2 may be incident inside of one of the plurality of holes HA. The reflected second light L2 may be reflected from the side wall SW. The second light L2 incident inside of one of the plurality of holes HA is reflected in a hole HA, and may not come outside the hole HA.

According to the present invention, the first light L1 incident on the display device DD (see FIG. 7) may be incident inside of each of the plurality of holes HA. The second light L2 incident on the display device DD (see FIG. 7) may be reflected from the sensor units SP1 and SP2 (see FIG. 6) and is incident inside of each of the plurality of holes HA. The lights L1 and L2 incident inside of each of the plurality of holes HA may be reflected from the side wall SW of each of the plurality of holes HA, and be trapped inside of each of the plurality of holes HA. Accordingly, the reflected light may not visible from the outside of the display device DD (see FIG. 7), and the sensor units SP1 and SP2 (see FIG. 6) may be prevented from being visible from the outside. Accordingly, the visibility of the underlying display device DD components (see FIG. 7) may be decreased.

Figure 10B:
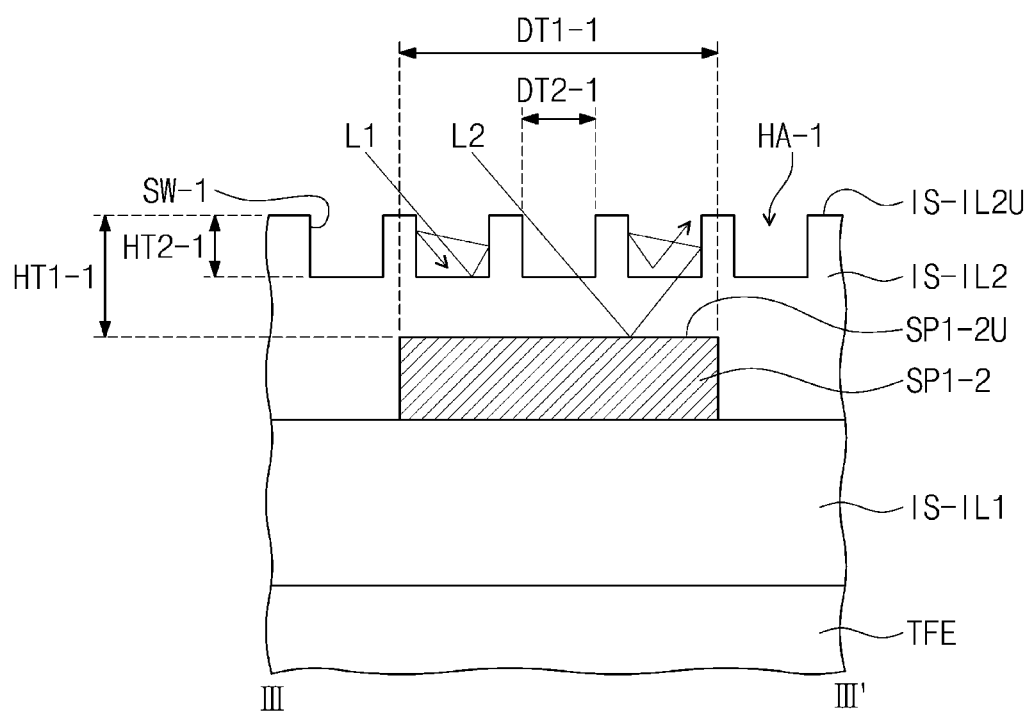

FIG. 10B is a cross-sectional view of a display device taken along line III-III' illustrated in FIG. 8. The same reference numerals are given to the elements described with reference to FIG. 10A, and the descriptions thereof are omitted.

Referring to FIG. 10B, the shapes of a plurality of holes HA-1 are quadrangular. However, this is only exemplary. According to an exemplary embodiment of the present invention, the shapes of the plurality of holes HA-1 may be polygonal.

A thickness HT1-1, which is the distance from the upper surface SP1-2U of the second mesh lines SP1-2 to the upper surface IS-IL2U of the second insulation layers IS-IL2, is greater than a depth HT2-1 of each of the plurality of holes HA-1.

A width DT1-1 of the second mesh lines SP1-2 is greater than a width DT2-1 of each of the plurality of holes HA-1.

At least some of the plurality of holes HA-1 overlap the second mesh lines SP1-2 in the third direction DR3.

According to the present invention, the first light L1 incident on the display device DD (see FIG. 7) may be incident inside of each of the plurality of holes HA-1. The second light L2 incident on the display device DD (see FIG. 7) may be reflected from the sensor units SP1 and SP2 (see FIG. 6) and are incident inside of each of the plurality of holes HA-1. The lights L1 and L2 incident inside of each of the plurality of holes HA-1 may be reflected from a side wall SW-1 of each of the plurality of holes HA-1 and may be trapped inside of each of the plurality of holes HA-1. Accordingly, the reflected light may not visible from the outside of the display device DD (see FIG. 7), and the sensor units SP1 and SP2 (see FIG. 6) may be prevented from being visible from the outside. The visibility of underlying components of the display device DD (see FIG. 7) may thus be increased.

Figure 11A:
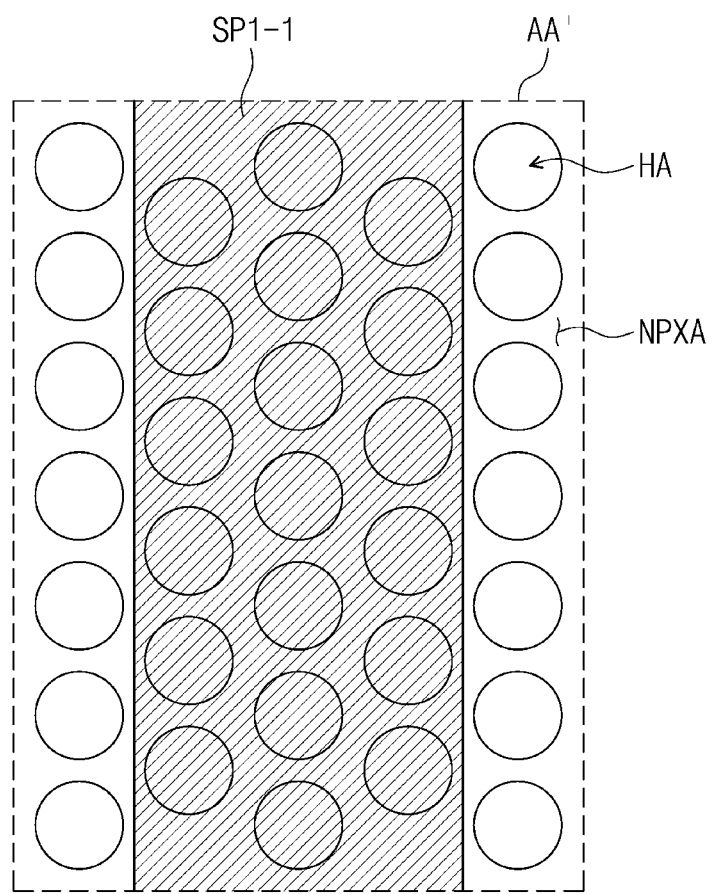

FIG. 11A is a plan view illustrating an enlarged view of region AA' illustrated in FIG. 8.

Referring to FIG. 11A, at least some of the plurality of holes HA overlap the first mesh lines SP1-1 on a plane defined by the fifth direction DR5 and fourth direction DR4. On a plane, the plurality of holes HA overlap the non-light emitting region NPXA.

The shapes of the plurality of holes HA are circular.

The plurality of holes HA are arranged in a zigzag shape.

Figure 11B:
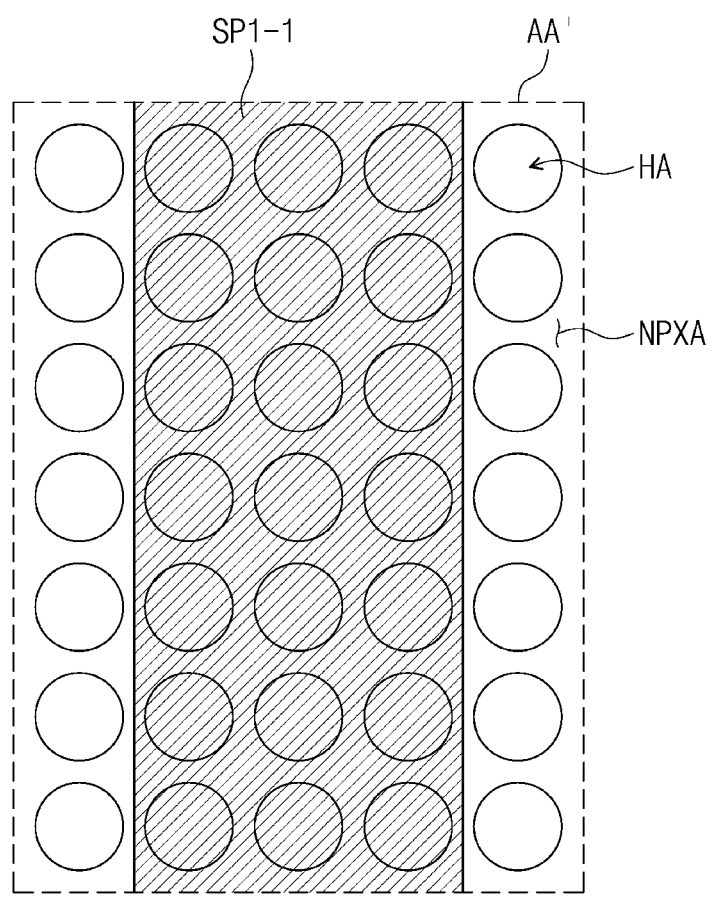

FIG. 11B is a plan view illustrating an enlarged view of region AA' illustrated in FIG. 8. The same reference numerals are given to the elements described with reference to FIG. 11A, and the descriptions thereof are omitted.

Referring to FIG. 11B, the plurality of holes HA may be arranged along the fourth direction DR4 and the fifth direction DR5 on a plane.

FIG. 11C is a plan view illustrating an enlarged view of region AA' illustrated in FIG. 8. The same reference numerals are given to the elements described with reference to FIG. 11A to FIG. 11B, and the descriptions thereof are omitted.

Reterring to FIG. 11C, at least some of a plurality of holes HA-2 overlap the first mesh lines SP1-1 in a plan view. For example, the plurality of holes HA-2 overlap the non-light emitting region NPXA in a plane defined by the fourth direction DR4 and the fifth direction DR5.

The shapes of the plurality of holes HA-2 are quadrangular. However, this is only exemplary. According to an exemplary embodiment of the present invention, the shapes of the plurality of holes HA-2 may be polygonal.

The plurality of holes HA-2 are arranged along the fourth direction DR4 and the fifth direction DR5 on a plane. However, this is only exemplary. The plurality of holes HA-2 according to an exemplary embodiment of the present invention may be arranged in various ways. For example, the plurality of holes HA-2 may be arranged in a zigzag shape.

In FIG. 11A to FIG. 11C, the plurality of holes HA provided to the second insulation layer IS-IL2 are illustrated as being arranged with a certain regularity. However, the embodiment of the present invention is not limited thereto. For example, the holes HA may be arranged on the second insulation layer IS-IL2 at irregular intervals.

According to the present invention, an input sensing panel may include a sensor unit and an insulation layer. A plurality of holes may be provided on an upper surface of the insulation layer. Light incident on a display device and light reflected from the sensor unit may be incident on the plurality of holes. The light incident on each of the plurality of holes may be reflected from a side wall of each of the plurality of holes and trapped inside the plurality of holes. Light reflected from the outside of the display device may not be visible. The visibility of underlying components of the display device may be decreased.

Although the present invention has been described with reference to exemplary embodiments of the present invention, it will be understood by those skilled in the art that various changes in form and details may be made therein without departing from the spirit and scope of the present invention. Accordingly, the technical scope of the present invention is not intended to be limited to the contents set forth in the detailed description of the specification, but is intended to be defined by the appended claims.

What is claimed is:

1. A display device, comprising:
    a display panel; and
    an input sensing panel disposed on the display panel,
    wherein the input sensing panel includes:
        a plurality of first sensor units arranged along a first direction;
        a first connection unit configured to connect the first sensor units;
        a plurality of second sensor units arranged along a second direction crossing the first direction;
        a second connection unit configured to connect the second sensor units;
        a first insulation layer disposed between the first connection unit and the second connection unit; and
        a second insulation layer covering the first insulation layer, wherein a plurality of holes is provided on an upper surface of the second insulation layer, and wherein a thickness of the second insulation layer is greater than a depth of each of the plurality of holes.

2. The display device of claim 1, wherein at least a portion of the plurality of holes overlaps the first sensor unit or the second sensor unit in a thickness direction.

3. The display device of claim 1, wherein each of the first sensor units and each of the second sensor units comprise first mesh lines and second mesh lines crossing the first mesh lines.

4. The display device of claim 3, wherein at least some of the plurality of holes overlap the first mesh lines or the second mesh lines.

5. The display device of claim 3, wherein a width of each of the plurality of holes is smaller than a width of each of the first mesh lines and a width of each of the second mesh lines.

6. The display device of claim 1, wherein the first insulation layer includes an inorganic material.

7. The display device of claim 1, wherein the first insulation layer includes an organic material.

8. The display device of claim 1, wherein each of the plurality of holes has a substantially circular shape.

9. The display device of claim 1, wherein each of the plurality of holes has a substantially polygonal shape.

10. The display device of claim 1, wherein the display panel comprises a light emitting region and a non-light emitting region adjacent to the light emitting region, and the plurality of holes does not overlap the light emitting region.

11. The display device of claim 10, wherein the plurality of holes overlaps the non-light emitting region.

12. The display device of claim 1, wherein at least a portion of each of the plurality of holes overlaps the first connection unit and/or the second connection unit.

13. The display device of claim 1, wherein the second insulation layer includes an inorganic material.

14. The display device of claim 1, wherein the second insulation layer includes an organic material.

15. An input sensing panel, comprising:
a plurality of first sensor units arranged along a first direction;
a first connection unit configured to connect adjacent first sensor units among the plurality of first sensor units,
a plurality of second sensor units arranged along a second direction crossing the first direction;
a second connection unit disposed on the first connection unit and configured to connect adjacent second sensor units among the plurality of second sensor units;
a first insulation layer disposed between the first connection unit and the second connection unit; and
a second insulation layer covering the first sensor units, the second sensor units, and the second connection unit, wherein a plurality of holes is provided on an upper surface of the second insulation layer, and the first sensor units and the second sensor units have a mesh shape, and the plurality of holes overlap the first sensor units and the second sensor units.

16. The input sensing panel of claim 15, wherein a thickness of a portion of the second insulation layer disposed on the first sensor units and the second sensor units is greater than a depth of each of the plurality of holes.

17. The input sensing panel of claim 15, wherein the first insulation layer includes an inorganic material.

18. The input sensing panel of claim 15, wherein the first insulation layer includes an organic material.

19. The input sensing panel of claim 15, wherein the second insulation layer includes an inorganic material.

20. The input sensing panel of claim 15, wherein the second insulation layer includes an organic material.

* * * * *